United States Patent
Xu et al.

(10) Patent No.: US 11,489,631 B2
(45) Date of Patent: Nov. 1, 2022

(54) COMMUNICATION METHOD AND COMMUNICATIONS DEVICE

(71) Applicant: Huawei Technologies Co., Ltd., Shenzhen (CN)

(72) Inventors: Xiaoying Xu, Shanghai (CN); Chunhua You, Shanghai (CN); Qufang Huang, Shanghai (CN); Xing Liu, Shenzhen (CN); Qinghai Zeng, Shanghai (CN); Li Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 16/787,986

(22) Filed: Feb. 11, 2020

(65) Prior Publication Data
US 2020/0177322 A1 Jun. 4, 2020

Related U.S. Application Data

(63) Continuation of application No. PCT/CN2018/099503, filed on Aug. 9, 2018.

(30) Foreign Application Priority Data

Aug. 11, 2017 (CN) .......................... 201710687913.9

(51) Int. Cl.
*H04L 1/18* (2006.01)
*H04W 76/11* (2018.01)
(Continued)

(52) U.S. Cl.
CPC ............ *H04L 1/1819* (2013.01); *H04L 1/188* (2013.01); *H04W 24/08* (2013.01);
(Continued)

(58) Field of Classification Search
CPC ..... H04L 1/1819; H04L 1/188; H04L 1/1896; H04L 1/1893; H04L 1/1671;
(Continued)

(56) References Cited

U.S. PATENT DOCUMENTS

2011/0019776 A1   1/2011  Zhang et al.
2015/0029955 A1*  1/2015  Heo ..................... H04B 7/0686
                                                    370/329
(Continued)

FOREIGN PATENT DOCUMENTS

CA        3049031 A1     7/2018
CN       101414900 A     4/2009
(Continued)

OTHER PUBLICATIONS

Line-numbered version of Fujitsu, "Discussions on HARQ for grant-free transmission," 3GPP TSG RAN WG1 NR Ad-Hoc#2, Qingdao, P. R. China, R1-1710239, XP051299459, pp. 1-4, 3rd Generation Partnership Project, Valbonne, France (Jun. 27-30, 2017) (Year: 2017).*
(Continued)

*Primary Examiner* — Jutai Kao
(74) *Attorney, Agent, or Firm* — Leydig, Voit & Mayer, Ltd.

(57) ABSTRACT

A communication method, a communications apparatus and a non-transitory computer-readable medium are provided. A network device receives data carried on a first scheduling-free resource via a first hybrid automatic repeat request (HARQ) process from a terminal device, and decodes the data to generate HARQ feedback information. The network device sends downlink control information (DCI) to the terminal device, where the DCI includes the HARQ feedback information and first indication information. The first indication information indicates the first HARQ process.

14 Claims, 4 Drawing Sheets

(51) Int. Cl.
  H04W 24/08  (2009.01)
  H04W 72/04  (2009.01)
  H04W 74/08  (2009.01)
(52) U.S. Cl.
  CPC ..... *H04W 72/042* (2013.01); *H04W 72/0413* (2013.01); *H04W 74/08* (2013.01); *H04W 76/11* (2018.02)
(58) Field of Classification Search
  CPC ... H04L 1/1822; H04L 1/1607; H04L 1/1812; H04W 76/11; H04W 24/08; H04W 72/042
  See application file for complete search history.

(56) References Cited

U.S. PATENT DOCUMENTS

| | | | |
|---|---|---|---|
| 2015/0230177 | A1 | 8/2015 | Futaki |
| 2018/0042043 | A1* | 2/2018 | Babaei ............... H04W 72/1273 |
| 2020/0245395 | A1* | 7/2020 | Zhang .................. H04L 5/0053 |

FOREIGN PATENT DOCUMENTS

| | | |
|---|---|---|
| CN | 101835271 A | 9/2010 |
| CN | 102158894 A | 8/2011 |
| CN | 103974390 A | 8/2014 |
| CN | 105991212 A | 10/2016 |
| CN | 106211093 A | 12/2016 |
| CN | 106664595 A | 5/2017 |
| CN | 109548133 A | 3/2019 |
| KR | 20160108235 A | 9/2016 |
| RU | 2529870 C2 | 10/2014 |
| WO | 0079750 A1 | 12/2000 |
| WO | 2017039564 A1 | 3/2017 |
| WO | 2017098384 A2 | 6/2017 |
| WO | 2017122959 A1 | 7/2017 |

OTHER PUBLICATIONS

"Discussions on HARQ for grant-free transmission," 3GPP TSG RAN WG1 NR Ad-Hoc#2, Qingdao, P.R. China, R1-1710239, XP051299459, pp. 1-4, 3rd Generation Partnership Project, Valbonne, France (Jun. 27-30, 2017).

"On HARQ Retransmission for SPS/Grant-Free," 3GPP TSG RAN WG1 NR Ad-Hoc#2, Qingdao, P.R. China, R1-1711505, Total 3 pages, 3rd Generation Partnership Project, Valbonne, France (Jun. 27-30, 2017).

"3rd Generation Partnership Project; Technical Specification Group Radio Access Network; NR; Medium Access Control (MAC) protocol specification (Release 15)," 3GPP TS 38.321 V0.2.0, pp. 1-36, 3rd Generation Partnership Project, Valbonne, France (Aug. 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.3.0, pp. 1-198, 3rd Generation Partnership Project, Valbonne, France (Jun. 2017).

"UL grant-free transmissions: Physical layer procedures," 3GPP TSG RAN WG1 NR Ad-Hoc#2, Qingdao, P.R. China, R1-1710887, XP051300089, pp. 1-4, 3rd Generation Partnership Project, Valbonne, France (Jun. 2017).

"On the determination of UE ID and HARQ process for UL grant-free transmission," 3GPP TSG RAN WG1 Meeting #90, Prague, Czech Republic, R1-1712215, Total 6 pages, 3rd Generation Partnership Project, Valbonne, France (Aug. 21-25, 2017).

"LS on HARQ operation," 3GPP TSG RAN WG1 NR AH#2, Qingdao, P.R. China, R1-1712008, Total 2 pages, 3rd Generation Partnership Project, Valbonne, France (Jun. 27-30, 2017).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.3.0, pp. 1-107, 3rd Generation Partnership Project, Valbonne, France (Jun. 2017).

"Retransmission Aspects for Uplink SPS," 3GPP TSG-RAN WG2#NR_AdHoc#2 Meeting, Qingdao, China, R2-1707097, XP051306708, Total 2 pages, 3rd Generation Partnership Project, Valbonne, France (Jun. 27-29, 2017).

"On multiple resource configuration for UL grant-free transmission," 3GPP TSG RAN WG1 Meeting #90, Prague, Czech Republic, R1-1712216, Total 5 pages, 3rd Generation Partnership Project, Valbonne, France (Aug. 21-25, 2017).

"3rd Generation Partnership Project; Technical Specification Group Radio Access Network; NR; Multiplexing and channel coding (Release 15)," 3GPP TS 38.212 V0.0.0, pp. 1-10, 3rd Generation Partnership Project, Valbonne, France (May 2017).

"UL data transmission without grant," 3GPP TSG RAN WG1 Meeting #89, Hangzhou, P.R. China, R1-1708479, XP051273671, pp. 1-3, 3rd Generation Partnership Project, Valbonne, France (May 15-19, 2017).

"HARQ design for uplink grant-free transmission," 3GPP TSG RAN WG1 Meeting #90, Prague, P.R. Czech, R1-1712689, Total 4 pages, 3rd Generation Partnership Project, Valbonne, France (Aug. 21-25, 2017).

"3rd Generation Partnership Project; Technical Specification Group Radio Access Network; NR; Physical layer procedures for data (Release 15)," 3GPP TS 38.214 V0.0.1, pp. 1-30, 3rd Generation Partnership Project, Valbonne, France (Jul. 2017).

"DRX related timers handling," 3GPP TSG-RAN WG2 Meeting #92, Anehaim, USA, R2-156766, pp. 1-3, 3rd Generation Partnership Project, Valbonne, France (Nov. 16-20, 2015).

\* cited by examiner

COMMUNICATION METHOD AND COMMUNICATIONS DEVICE

CROSS-REFERENCE TO RELATED APPLICATIONS

This application is a continuation of International Application No. PCT/CN2018/099503, filed on Aug. 9, 2018, which claims priority to Chinese Patent Application No. 201710687913.9, filed on Aug. 11, 2017. The disclosures of the aforementioned applications are hereby incorporated by reference in their entireties.

TECHNICAL FIELD

Embodiments of this application relate to the communications field, and more specifically, to a communication method and a communications device.

BACKGROUND

Hybrid automatic repeat request (HARQ) is a technology combining a forward error correction (FEC) method and an automatic repeat request (ARQ) method.

HARQ is a function at a MAC layer, and exists at both a transmit end and a receive end. A HARQ operation at the transmit end includes: transmitting and retransmitting a transport block (TB), and receiving and processing an ACK/NACK. A HARQ operation at the receive end includes: receiving a TB, performing soft combination on the received TB, and generating an ACK/NACK. A stop-and-wait protocol is used in the HARQ to send data.

In the stop-and-wait protocol, after sending a TB, the transmit end stops to wait for acknowledgement information. Only one-bit information is needed for acknowledgement (ACK) or negative acknowledgement (NACK) of the transport block. However, after each transmission, the transmit end stops to wait for the acknowledgement, thereby resulting in a very low throughput. Therefore, a plurality of parallel HARQ processes are used in LTE. Specifically, when waiting for the acknowledgment information in one HARQ process, the transmit end may use another HARQ process to send data. These HARQ processes jointly form a HARQ entity. This HARQ entity is combined with the stop-and-wait protocol to allow continuous transmission of the data.

Data sent at the receive end from a MAC layer to an RLC layer may be disordered because the plurality of parallel HARQ processes are used. Therefore, the received data needs to be reordered at the RLC layer. Therefore, after receiving one piece of feedback information (ACK/NACK), the transmit end needs to know a HARQ process corresponding to the acknowledgment information, in other words, needs to know a HARQ process identity (HARQ PID) corresponding to the acknowledgment information. The HARQ PID is essentially used to identify a currently transmitted TB. During retransmission, the receiving end needs to notify the transmit end which TB needs to be retransmitted, to be specific, needs to notify the transmit end of a HARQ PID corresponding to the TB that needs to be retransmitted.

Usually, when sending data by using a grant-free (GF) resource, a terminal device needs to determine a current HARQ process. When a network device sends a HARQ feedback information to the terminal device, the terminal device needs to know a HARQ process corresponding to the HARQ feedback information.

SUMMARY

This application provides a communication method and a communications device. A HARQ process corresponding to HARQ feedback information is further indicated while the HARQ feedback information is sent to a terminal device by using DCI, so that the terminal device can efficiently process data of the corresponding HARQ process based on the HARQ feedback information, to improve data transmission efficiency.

According to a first aspect, a communication method is provided. The communication method includes: receiving, by a network device from a terminal device, data carried on a first scheduling-free resource, where the data is transmitted by using a first hybrid automatic repeat request HARQ process; decoding, by the network device, the data to generate HARQ feedback information; and sending, by the network device, downlink control information DCI to the terminal device, where the DCI includes the HARQ feedback information, the DCI further includes first indication information, and the first indication information is used to indicate the first HARQ process.

In the solution provided in this application, for uplink data sent by the terminal device by using a scheduling-free resource, a HARQ process corresponding to the HARQ feedback information is further indicated while the HARQ feedback information is sent to the terminal device by using the DCI, so that the terminal device can efficiently process data of the corresponding HARQ process based on the HARQ feedback information, to improve data transmission efficiency.

With reference to the first aspect, in a possible implementation of the first aspect, the first indication information is carried in a HARQ process identity field in the DCI.

In the solution provided in this application, for uplink data sent by the terminal device by using a scheduling-free resource, a HARQ process corresponding to the HARQ feedback information is further indicated by using an existing HARQ process identity field in the DCI while the HARQ feedback information is sent to the terminal device by using the DCI, so that the terminal device can efficiently process data of the corresponding HARQ process based on the HARQ feedback information, to improve data transmission efficiency. In addition, a HARQ process on which scheduling-free transmission is performed is indicated by using the existing field in the DCI, to reduce signaling overheads.

With reference to the first aspect, in a possible implementation of the first aspect, the first scheduling-free resource is used to transmit only data of the first HARQ process, and the first indication information is specifically used to indicate the first scheduling-free resource.

In the solution provided in this application, when a scheduling-free resource is in a one-to-one correspondence with a HARQ process, the scheduling-free resource is used to notify the terminal device of a HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

With reference to the first aspect, in a possible implementation of the first aspect, the DCI is scrambled by using a first radio network temporary identifier RNTI, the first RNTI is used to indicate that the DCI includes feedback information of data sent by using a scheduling-free resource, and the first indication information is carried in a HARQ process identity field.

In the solution provided in this application, when a scheduling-free resource is in a one-to-one correspondence with a HARQ process, the DCI is scrambled by using an RNTI to notify the terminal device that the HARQ process identity field in the DCI is reused to indicate a HARQ process corresponding to the HARQ feedback information. Specifically, the first indication information carried in the HARQ process identity field indicates the HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

With reference to the first aspect, in a possible implementation of the first aspect, the DCI includes a first field, and the first field is used to indicate that the first indication information is carried in a HARQ process identity field.

In the solution provided in this application, when a scheduling-free resource is in a one-to-one correspondence with a HARQ process, the first field in the DCI is used to notify the terminal device that the HARQ process identity field in the DCI is reused to indicate a HARQ process corresponding to the HARQ feedback information. Specifically, the first indication information carried in the HARQ process identity field indicates the HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

With reference to the first aspect, in a possible implementation of the first aspect, the sending, by the network device, DCI to the terminal device includes: sending, by the network device, a physical downlink control channel PDCCH at a first resource location, where the PDCCH carries the DCI, and the first indication information is carried in a HARQ process identity field.

In the solution provided in this application, when a scheduling-free resource is in a one-to-one correspondence with a HARQ process, a resource location used to send the PDCCH that carries the DCI is used to notify the terminal device that the HARQ process identity field in the DCI is reused to indicate a HARQ process corresponding to the HARQ feedback information. Specifically, the first indication information carried in the HARQ process identity field indicates the HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

With reference to the first aspect, in a possible implementation of the first aspect, the first scheduling-free resource is further used to transmit data of a second HARQ process, the first HARQ process and the second HARQ process correspond to different time domain locations on the first scheduling-free resource, the DCI further includes second indication information, and the second indication information is used to indicate the first scheduling-free resource.

In the solution provided in this application, the first scheduling-free resource is indicated by using the second indication information in the DCI, and the first HARQ process on the first scheduling-free resource is further indicated by using the first indication information in the DCI, so that the terminal device can determine a HARQ process corresponding to the HARQ feedback information, and process data of the corresponding HARQ process, to improve data transmission efficiency.

With reference to the first aspect, in a possible implementation of the first aspect, the communication method further includes:

receiving, by the network device from the terminal device, data of a third HARQ process and data of a fourth HARQ process that are carried on a second scheduling-free resource, where the third HARQ process and the fourth HARQ process correspond to different time domain locations on the second scheduling-free resource, the third HARQ process and the first HARQ process have a same process identity, and the fourth HARQ process and the second HARQ process have a same process identity.

With reference to the first aspect, in a possible implementation of the first aspect, a process identity of the first HARQ process, a process identity of the second HARQ process, and a process identity of a HARQ process for sending data on a scheduling resource are different from each other, and the process identity of the first HARQ process, the process identity of the second HARQ process, and the process identity of the HARQ process for sending the data on the scheduling resource each are one of M HARQ process identities, where M is an integer greater than 1.

According to a second aspect, a communication method is provided. The communication method includes: sending, by a terminal device, data to a network device on a first scheduling-free resource, where the data is transmitted by using a first hybrid automatic repeat request HARQ process; receiving, by the terminal device, downlink control information DCI from the network device, where the DCI includes HARQ feedback information, the HARQ feedback information is generated based on a decoding result of the data, the DCI further includes first indication information, and the first indication information is used to indicate the first HARQ process; and processing, by the terminal device, data of the first HARQ process based on the HARQ feedback information.

With reference to the second aspect, in a possible implementation of the second aspect, the first scheduling-free resource is used to transmit only the data of the first HARQ process, and the first indication information is specifically used to indicate the first scheduling-free resource; and the communication method further includes: determining, by the terminal device based on a scheduling-free resource indicated by the first indication information, that a HARQ process corresponding to the HARQ feedback information is the first HARQ process.

With reference to the second aspect, in a possible implementation of the second aspect, the DCI is scrambled by using a first radio network temporary identifier RNTI, the first RNTI is used to indicate that the DCI includes feedback information of data sent by using a scheduling-free resource, and the first indication information is carried in a HARQ process identity field; and the communication method further includes: determining, by the terminal device based on the first indication information, that the HARQ process corresponding to the HARQ feedback information is the first HARQ process.

With reference to the second aspect, in a possible implementation of the second aspect, the DCI includes a first field, and the first field is used to indicate that the first indication information is carried in a HARQ process identity field; and the communication method further includes: determining, by the terminal device based on the first indication information, that the HARQ process corresponding to the HARQ feedback information is the first HARQ process.

With reference to the second aspect, in a possible implementation of the second aspect, the receiving, by the terminal device, downlink control information DCI sent by the network device includes: receiving, by the terminal device at a first resource location, a physical downlink control channel PDCCH from the network device, where the PDCCH carries the DCI, and the first indication information is carried in a HARQ process identity field; and the communication method further includes: determining, by the terminal device based on the first indication information, that the HARQ process corresponding to the HARQ feedback information is the first HARQ process.

With reference to the second aspect, in a possible implementation of the second aspect, the first scheduling-free resource is further used to transmit data of a second HARQ process, the first HARQ process and the second HARQ process correspond to different time domain locations on the first scheduling-free resource, the DCI further includes second indication information, and the second indication information is used to indicate the first scheduling-free resource; and the communication method further includes: determining, by the terminal device based on the first indication information and the second indication information, that a HARQ process corresponding to the HARQ feedback information is the first HARQ process.

With reference to the second aspect, in a possible implementation of the second aspect, the communication method further includes:

sending, by the terminal device to the network device, data of a third HARQ process and data of a fourth HARQ process on a second scheduling-free resource, where the third HARQ process and the fourth HARQ process correspond to different time domain locations on the second scheduling-free resource, the third HARQ process and the first HARQ process have a same process identity, and the fourth HARQ process and the second HARQ process have a same process identity.

With reference to the second aspect, in a possible implementation of the second aspect, a process identity of the first HARQ process, a process identity of the second HARQ process, and a process identity of a HARQ process for sending data on a scheduling resource are different from each other, and the process identity of the first HARQ process, the process identity of the second HARQ process, and the process identity of the HARQ process for sending the data on the scheduling resource each are one of M HARQ process identities, where M is an integer greater than 1.

According to a third aspect, a network device is provided. The network device is configured to perform the method according to any one of the first aspect or the possible implementations of the first aspect. Specifically, the network device may include a module configured to perform the method according to any one of the first aspect or the possible implementations of the first aspect.

According to a fourth aspect, a network device is provided. The network device includes a memory and a processor. The memory is configured to store an instruction, the processor is configured to execute the instruction stored in the memory, and execution of the instruction stored in the memory enables the processor to perform the method according to any one of the first aspect or the possible implementations of the first aspect.

According to a fifth aspect, a chip is provided. The chip includes a processing module and a communications interface. The processing module is configured to control the communications interface to communicate with the external, and the processing module is further configured to implement the method according to any one of the first aspect or the possible implementations of the first aspect.

According to a sixth aspect, a computer readable storage medium is provided, and stores a computer program. When the computer program is executed by a computer, the method according to any one of the first aspect or the possible implementations of the first aspect is implemented. Specifically, the computer may be the foregoing network device.

According to a seventh aspect, a computer program product including an instruction is provided. When the instruction is executed by a computer, the method according to any one of the first aspect or the possible implementations of the first aspect is implemented. Specifically, the computer may be the foregoing network device.

According to an eighth aspect, a terminal device is provided. The terminal device is configured to perform the method according to any one of the second aspect or the possible implementations of the second aspect. Specifically, the terminal device may include a module configured to perform the method according to any one of the second aspect or the possible implementations of the second aspect.

According to a ninth aspect, a terminal device is provided. The terminal device includes a memory and a processor. The memory is configured to store an instruction, the processor is configured to execute the instruction stored in the memory, and execution of the instruction stored in the memory enables the processor to perform the method according to any one of the second aspect or the possible implementations of the second aspect.

According to a tenth aspect, a chip is provided. The chip includes a processing module and a communications interface. The processing module is configured to control the communications interface to communicate with the external, and the processing module is further configured to implement the method according to any one of the second aspect or the possible implementations of the second aspect.

According to an eleventh aspect, a computer readable storage medium is provided, and stores a computer program. When the computer program is executed by a computer, the method according to any one of the second aspect or the possible implementations of the second aspect is implemented. Specifically, the computer may be the foregoing terminal device.

According to a twelfth aspect, a computer program product including an instruction is provided. When the instruction is executed by a computer, the method according to any one of the second aspect or the possible implementations of the second aspect is implemented. Specifically, the computer may be the foregoing terminal device.

DESCRIPTION OF EMBODIMENTS

The following describes technical solutions in this application with reference to the accompanying drawings.

Figure 1:
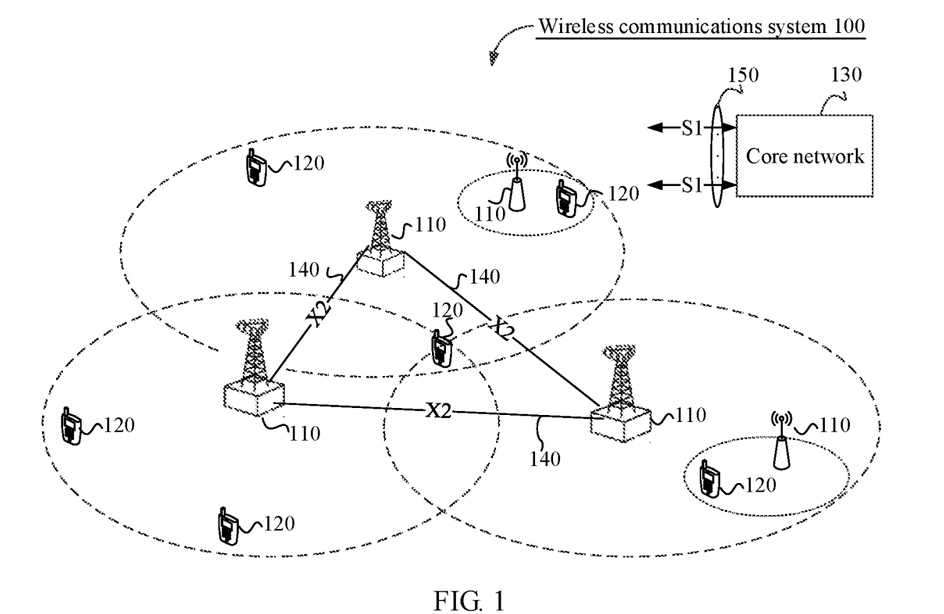
FIG. 1 is a schematic diagram of a communications system according to an embodiment of this application.

FIG. 1 shows a wireless communications system 100 in this application. The wireless communications system 100 may work on a high frequency band, and is not limited to a long term evolution (LTE) system, or may be a future evolved 5th generation (5G) mobile communications system, a new radio (NR) system, a machine-to-machine (M2M) communications system, or the like. As shown in FIG. 1, the wireless communications system 100 may include one or more network devices 110, one or more terminal devices 120, and a core network 130.

The network device 110 may be a base station. The base station may be configured to communicate with one or more terminal devices, or may be configured to communicate with one or more base stations having some terminal device functions (for example, communicate with a macro base station and a micro base station or communicate with access points). The base station may be an evolved NodeB (eNB) in an LTE system, and a base station in a 5G system or an NR system. In addition, the base station may also be an access point (AP), a transmission node (TRP), a central unit (CU), or another network entity, and may include some or all of functions of the foregoing network entities.

The terminal device 120 may be distributed in the entire wireless communications system 100, and may be static or mobile. In some embodiments of this application, the terminal device 120 may be a mobile device, a mobile station, a mobile unit, an M2M terminal device, a radio unit, a remote unit, a user agent, a mobile client, user equipment (UE), or the like.

Specifically, the network device 110 may be configured to communicate with the terminal device 120 by using one or more antennas under control of a network device controller (not shown in FIG. 1). In some embodiments, the network device controller may be a part of the core network 130, or may be integrated into the network device 110. Specifically, the network device 110 may be configured to transmit control information or user data to the core network 130 by using a backhaul interface 150 (for example, an S1 interface). Specifically, the network devices 110 may also communicate with each other directly or indirectly by using a backhaul interface 140 (for example, an X2 interface).

The wireless communications system shown in FIG. 1 is merely intended to more clearly describe the technical solutions in this application, but constitutes no limitation on this application. A person of ordinary skill in the art may know that the technical solutions provided in this embodiment of this application are also applicable to a similar technical problem as a network architecture evolves and a new service scenario emerges.

A communication method and a communications device provided in embodiments of this application are applicable to a scenario in which uplink transmission is performed by using a scheduling-free resource.

The scheduling-free resource is a resource pre-configured by a network device for a terminal device. To be specific, the terminal device can perform data transmission on the scheduling-free resource without a need to send a scheduling request. The scheduling-free resource is a contention-based resource. To be specific, a plurality of terminal devices contend for using the resource.

The scheduling-free resource may also be referred to as a grant-free (GF) resource.

Figure 2:
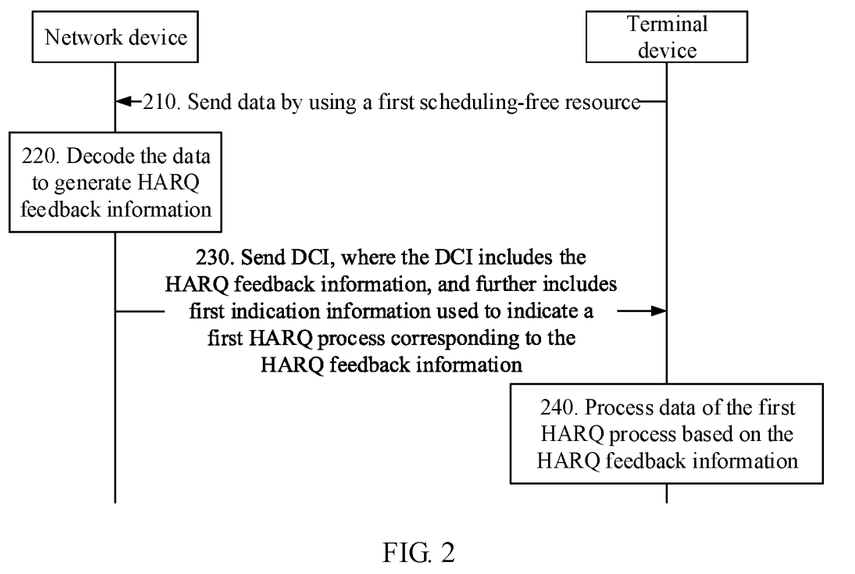
FIG. 2 is a schematic flowchart of a communication method according to an embodiment of this application.

FIG. 2 is a schematic flowchart of a communication method 200 according to an embodiment of this application. For example, a terminal device in the communication method 200 is the terminal device 120 shown in FIG. 1, and a network device in the communication method 200 is the network device 110 shown in FIG. 1. As shown in FIG. 2, the communication method 200 includes the following steps.

210. The terminal device sends data to the network device by using a first scheduling-free resource, where the data is transmitted by using a first hybrid automatic repeat request (HARQ) process. Correspondingly, the network device receives, from the terminal device, the data carried on the first scheduling-free resource.

220. The network device decodes the data to generate HARQ feedback information.

230. The network device sends downlink control information (DCI) to the terminal device, where the DCI includes the HARQ feedback information, the DCI further includes first indication information, and the first indication information is used to indicate the first HARQ process. Correspondingly, the terminal device receives the DCI sent by the network device.

In this application, a HARQ process for transmitting data by using a scheduling resource is briefly referred to as a scheduled HARQ process, and a HARQ process for transmitting data by using a scheduling-free resource is referred to as a scheduling-free HARQ process. For example, the first HARQ process is the scheduling-free HARQ process.

240. The terminal device processes data of the first HARQ process based on the HARQ feedback information.

In this embodiment of this application, for uplink data sent by the terminal device by using a scheduling-free resource, a HARQ process corresponding to the HARQ feedback information is further indicated while the HARQ feedback information is sent to the terminal device by using the DCI, so that the terminal device can efficiently process data of the corresponding HARQ process based on the HARQ feedback information, to improve data transmission efficiency.

It should be understood that the DCI includes a HARQ process identity field, and the HARQ process identity field is used to indicate a HARQ process identity (HARQ PID). In an example, if the HARQ process identity field includes three bits, the HARQ process identity field may indicate eight HARQ PIDs, in other words, may indicate eight HARQ processes.

In this embodiment, the first indication information may be carried in the HARQ process identity field in the DCI.

The first indication information is used to indicate the first HARQ process, for example, the first indication information is a HARQ PID of the first HARQ process. It should be understood that the first HARQ process is the scheduling-free HARQ process. Therefore, the HARQ process identity field in the DCI is used to indicate the scheduling-free HARQ process. If the HARQ process identity field in the DCI is originally also used to indicate the scheduled HARQ process, the HARQ process identity field in the DCI is used to indicate both the scheduling-free HARQ process and the scheduled HARQ process.

For example, it is assumed that the HARQ process identity field in the DCI includes two bits, where 00 represents a scheduling-free HARQ process, 01 represents a scheduling-free HARQ process, 10 represents a scheduled HARQ process, and 11 represents a scheduled HARQ process. In an example, the first indication information is represented by 00.

In this embodiment of this application, for uplink data sent by the terminal device by using a scheduling-free resource, a HARQ process corresponding to the HARQ feedback information is further indicated by using an existing HARQ process identity field in the DCI while the HARQ feedback information is sent to the terminal device by using the DCI, so that the terminal device can efficiently process data of the corresponding HARQ process based on the HARQ feedback information, to improve data transmission efficiency. In addition, a HARQ process on which scheduling-free transmission is performed is indicated by using the existing field in the DCI, to reduce signaling overheads.

Specifically, in step 210, the terminal device sends data of a HARQ process to the network device on the first scheduling-free resource. The terminal device may use any one of the following methods to determine the HARQ process for sending the data to the network device by using the first scheduling-free resource.

Method 1:

Each scheduling-free resource of the terminal device corresponds to at least one HARQ process, in other words, there is a mapping relationship between the scheduling-free resource and the HARQ process. When the terminal device needs to send data on the first scheduling-free resource, the terminal device chooses to perform sending by using a HARQ process that is in a mapping relationship with the first scheduling-free resource.

The mapping relationship between the scheduling-free resource and the HARQ process may be predefined by a system, or may be configured by the network device for the terminal device by using signaling. In this application, the signaling may be radio resource control (RRC) signaling or physical layer signaling, or may be medium access control (MAC) layer signaling.

Alternatively, the mapping relationship between the scheduling-free resource and the HARQ process may be implicitly determined. For example, the mapping relationship between the scheduling-free resource and the HARQ process may be determined based on at least one of time domain information of a time-frequency resource, a sending period of the scheduling-free resource, a quantity of HARQ processes that can be used on the scheduling-free resource, a resource identity (ID) of the scheduling-free resource, and a time domain offset of the scheduling-free resource.

In an example, a method for implicitly determining a HARQ PID corresponding to the scheduling-free resource is as follows:

HARQ PID=[Floor (Scheduling-free resource ID)] modulo Total quantity of scheduling-free HARQ processes+ Offset, where floor represents rounding down and modulo represents a modulo operation. Optionally, the offset represents a start number of a reserved ID, and may be configured by using signaling or set to a default value, for example, may be set to 0 by default.

Method 2:

When the terminal device needs to send data on the first scheduling-free resource, the terminal device chooses to perform sending by using a current idle HARQ process.

Specifically, the HARQ feedback information may represent any feedback information of the network device for received uplink data. The terminal device may perform different processing based on different feedback information. Correspondingly, in step 240, the terminal device processes the data of the first HARQ process based on content indicated by the HARQ feedback information.

The HARQ feedback information may be an ACK. Correspondingly, in step 240, the terminal device determines, based on the ACK, that the data of the first HARQ process is successfully transmitted.

The HARQ feedback information may be a NACK. Correspondingly, in step 240, the terminal device determines, based on the NACK, that the data of the first HARQ process fails to be transmitted. Further, the terminal device may retransmit the data of the first HARQ process by using a scheduling-free resource; or the terminal device may obtain a scheduling resource by receiving scheduling grant information from the network device, and retransmit the data of the first HARQ process by using the scheduling resource. It may be understood that the scheduling grant information may also be included in the HARQ feedback information.

In this application, the network device may indicate, to the terminal device in different manners, a HARQ process (corresponding to the first HARQ process in some embodiments) corresponding to the HARQ feedback information.

Optionally, in an embodiment, the first scheduling-free resource is used to transmit only the data of the first HARQ process, and the first indication information is specifically used to indicate the first scheduling-free resource. The communication method 200 further includes: determining, by the terminal device based on a scheduling-free resource indicated by the first indication information, that a HARQ process corresponding to the HARQ feedback information is the first HARQ process.

Because the first scheduling-free resource is used to transmit only the data of the first HARQ process, the first scheduling-free resource is in a one-to-one correspondence with the first HARQ process. For example, a resource ID of the first scheduling-free resource is in a correspondence with a HARQ PID of the first HARQ process.

The determining, by the terminal device, that a HARQ process corresponding to the HARQ feedback information is the first HARQ process specifically includes: determining, by the terminal device based on the scheduling-free resource indicated by the first indication information and a correspondence between the scheduling-free resource and the HARQ process, that the HARQ process corresponding to the HARQ feedback information is the first HARQ process.

Specifically, the first indication information is the resource ID of the first scheduling-free resource.

In this embodiment, when the scheduling-free resource is in a one-to-one correspondence with the HARQ process, the scheduling-free resource is used to notify the terminal device of the HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

Optionally, in another embodiment, the first scheduling-free resource is used to transmit only the data of the first HARQ process, the DCI is scrambled by using a first radio network temporary identifier (RNTI), the first RNTI is used to indicate that the DCI includes feedback information of data sent by using a scheduling-free resource, and the first indication information is carried in a HARQ process identity field. The communication method 200 further includes: determining, by the terminal device based on the first indication information, that the HARQ process corresponding to the HARQ feedback information is the first HARQ process.

It should be understood that the first RNTI is an RNTI configured by the network for the terminal device.

A PDCCH that carries the DCI is scrambled by using the first RNTI. It indicates that the DCI includes HARQ feedback information for scheduling-free transmission, to be specific, the HARQ feedback information is HARQ feedback information of the data transmitted by the scheduling-free resource. In addition, the DCI is scrambled by using the first RNTI. It further indicates that the HARQ process identity field in the DCI is reused to indicate the HARQ process corresponding to the HARQ feedback information, to be specific, the first indication information is carried in the HARQ process identity field.

It should be understood that the terminal device may also include a second RNTI. The second RNTI is used to scramble a PDCCH that is not used to carry the feedback information of the data sent by using the scheduling-free resource. The second RNTI is configured by the network for the terminal device.

After the terminal device receives the DCI from the network device, if the terminal device finds that the DCI is scrambled by using the first RNTI, the terminal device determines that the HARQ process identity field in the DCI is reused to indicate the HARQ process (namely, the first HARQ process) corresponding to the HARQ feedback information. Therefore, the terminal device decodes the DCI by using the first RNTI, and then learns the first HARQ process based on the first indication information in the HARQ process identity field in the DCI.

In this embodiment, when a scheduling-free resource is in a one-to-one correspondence with a HARQ process, the DCI is scrambled by using an RNTI to notify the terminal device that the HARQ process identity field in the DCI is reused to indicate the HARQ process corresponding to the HARQ feedback information. Specifically, the first indication information carried in the HARQ process identity field indicates the HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

Optionally, in another embodiment, the first scheduling-free resource is used to transmit only the data of the first HARQ process, the DCI includes a first field, and the first field is used to indicate that the first indication information is carried in the HARQ process identity field. The communication method 200 further includes: determining, by the terminal device based on the first indication information, that the HARQ process corresponding to the HARQ feedback information is the first HARQ process.

Specifically, the DCI includes the first field and the HARQ process identity field. The first field is used to indicate that the HARQ process identity field is reused, and is used to indicate the HARQ process corresponding to the HARQ feedback information. Specifically, the first indication information carried in the HARQ process identity field is used to indicate the HARQ process corresponding to the HARQ feedback information.

After receiving the DCI, the terminal device learns, based on the first field in the DCI, that the first indication information carried in the HARQ process identity field in the DCI is used to indicate the HARQ process corresponding to the HARQ feedback information, and then determines the first HARQ process based on the first indication information.

In this embodiment, when a scheduling-free resource is in a one-to-one correspondence with a HARQ process, the first field in the DCI is used to notify the terminal device that the HARQ process identity field in the DCI is reused to indicate the HARQ process corresponding to the HARQ feedback information. Specifically, the first indication information carried in the HARQ process identity field indicates the HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

Optionally, in another embodiment, the first scheduling-free resource is used to transmit only the data of the first HARQ process. That step 230: The network device sends DCI to the terminal device includes: sending, by the network device, a physical downlink control channel (PDCCH) at a first resource location, where the PDCCH carries the DCI, and the first indication information is carried in a HARQ process identity field. Correspondingly, the terminal device receives, at the first resource location, the PDCCH from the network device, where the PDCCH carries the DCI, and the first indication information is carried in the HARQ process identity field. The communication method 200 further includes: determining, by the terminal device based on the first indication information, that the HARQ process corresponding to the HARQ feedback information is the first HARQ process.

In this embodiment, the first resource location may indicate that the HARQ process identity field in the DCI carried in the PDCCH is reused to indicate the HARQ process corresponding to the HARQ feedback information. In other words, if the terminal device determines that a resource location used to send the PDCCH that carries the DCI is the first resource location, the terminal device learns that the HARQ process identity field in the DCI is reused to indicate the HARQ process corresponding to the HARQ feedback information, and then determines the first HARQ process based on the first indication information carried in the HARQ process identity field.

It should be noted that in this embodiment, different resource locations of the PDCCH indicate whether the HARQ process identity field in the DCI is reused, and are used to indicate a scheduling-free HARQ process. For example, a resource location 1 indicates that the HARQ process identity field in the DCI is reused, and is used to indicate a scheduling-free HARQ process; and a resource location 2 indicates that the HARQ process identity field in the DCI is not reused. It should be understood that a correspondence between the resource location and a fact indicating whether the HARQ process identity field in the DCI is reused needs to be pre-configured.

In this embodiment, when a scheduling-free resource is in a one-to-one correspondence with a HARQ process, the resource location used to send the PDCCH that carries the DCI is used to notify the terminal device that the HARQ process identity field in the DCI is reused to indicate the HARQ process corresponding to the HARQ feedback information. Specifically, the first indication information carried in the HARQ process identity field indicates the HARQ process corresponding to the HARQ feedback information, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

Figure 3:
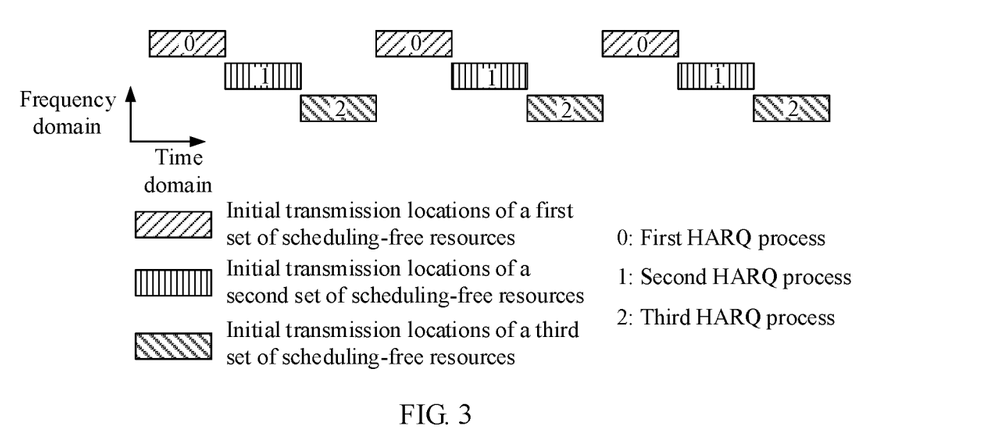
FIG. 3 is a schematic diagram of a scheduling-free resource and a HARQ process according to an embodiment of this application.
Figure 4:
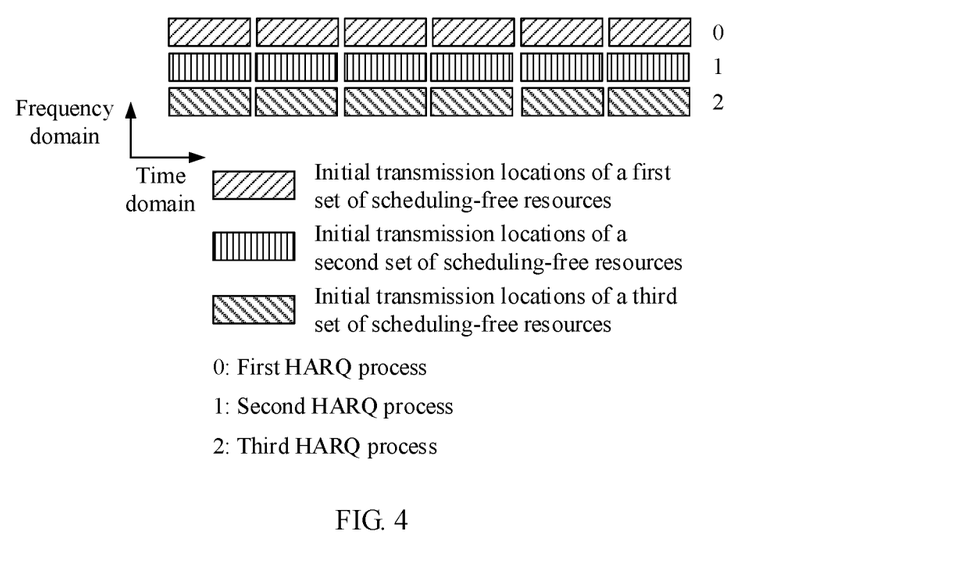
FIG. 4 is another schematic diagram of a scheduling-free resource and a HARQ process according to an embodiment of this application.

Specifically, as shown in FIG. 3 or FIG. 4, a scheduling-free resource is in a one-to-one correspondence with a HARQ process. A first set of scheduling-free resources corresponds to first HARQ processes, a second set of scheduling-free resources corresponds to second HARQ processes, and a third set of scheduling-free resources corresponds to third HARQ processes. In other words, the first set of scheduling-free resources is used to transmit only data of the first HARQ processes, the second set of scheduling-free resources is used to transmit only data of the second HARQ processes, and the third set of scheduling-free resources is used to transmit only data of the third HARQ processes.

It should be understood that frequency domain locations of different sets of scheduling-free resources are different from each other.

A difference between FIG. 3 and FIG. 4 lies in whether initial transmission time domain locations of each set of scheduling-free resources are consecutive.

As shown in FIG. 3, initial transmission time domain locations of each set of scheduling-free resources are inconsecutive, initial transmission time domain locations of different sets of scheduling-free resources are different from each other, and entire initial transmission time domain locations of the three sets of scheduling-free resources as a whole are consecutive. It can be learned from FIG. 3 that the initial transmission time domain locations of the first, second, and third set of scheduling-free resources as a whole are consecutive. An interval between the initial transmission time domain locations of each set of scheduling-free resources is greater than or equal to a quantity of times the terminal device automatically repeats sending.

It should be understood that in FIG. 3, a part of resources (not shown in FIG. 3) between two adjacent initial transmission time domain locations of each set of scheduling-free resources can only be used for repetitions. To be specific, the initial transmission time domain locations of each set of scheduling-free resources are fixed.

As shown in FIG. 4, initial transmission time domain locations of each set of scheduling-free resources are consecutive. To be specific, the initial transmission time domain locations of each set of scheduling-free resources are not fixed. The terminal device may initiate initial transmission at any resource location.

For example, the terminal device sends first data at a time domain location 1 of the first set of scheduling-free resources, and then sends second data at a time domain location 2 of the first set of scheduling-free resources. The terminal device sends new data indication information while or before sending the second data. The new data indication information is used to indicate that the second data is different from the first data, in other words, transmission of the second data is not retransmission of the first data, and the second data is also initial transmission data. The network device may learn, based on the new data indication information, that the second data is the initial transmission data. Although the second data and the first data belong to a same HARQ process, the second data cannot be combined with the first data.

Optionally, in a transmission process based on the scheduling-free resource, the terminal device may further indicate, by using different resources on which different reference signals are located, whether current data is initially transmitted or retransmitted.

In the design of this embodiment, initial transmission through the HARQ process can be initiated at any time. Compared with the prior art in which initial transmission through the HARQ process can be initiated only in a fixed time domain location, a transmission delay can be reduced in the solution of this embodiment.

In some embodiments, the foregoing describes how the network device notifies, when the scheduling-free resource is in the one-to-one correspondence with the HARQ process, the terminal device of the HARQ process corresponding to the HARQ feedback information. The following describes how the network device notifies, when the scheduling-free resource is in a one-to-many correspondence with the HARQ process, the terminal device of the HARQ process corresponding to the HARQ feedback information.

Optionally, in another embodiment, the first scheduling-free resource is further used to transmit data of a second HARQ process, the first HARQ process and the second HARQ process correspond to different time domain locations on the first scheduling-free resource, the DCI further includes second indication information, and the second indication information is used to indicate the first scheduling-free resource.

Figure 5:
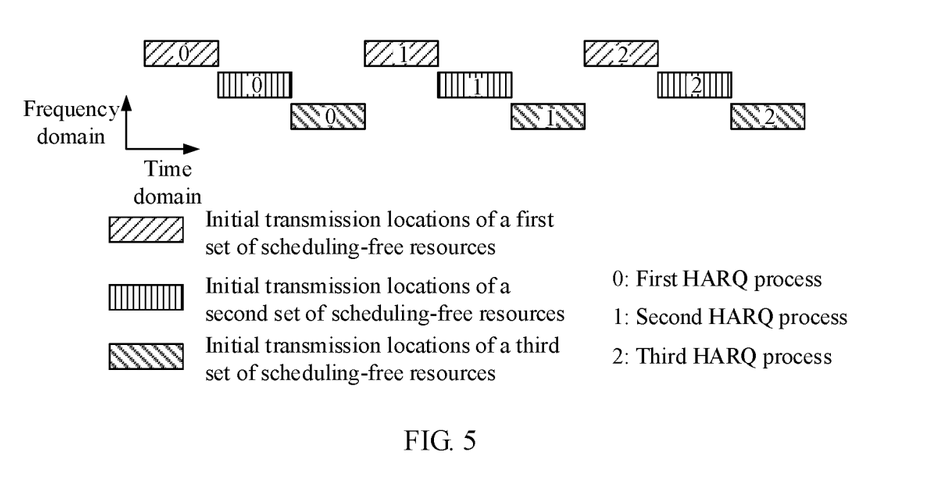
FIG. 5 is still another schematic diagram of a scheduling-free resource and a HARQ process according to an embodiment of this application.

Specifically, the first scheduling-free resource is shown in a first set of scheduling-free resources in FIG. 5.

In this embodiment, the first indication information is used to indicate the first HARQ process, and the second indication information is used to indicate the first scheduling-free resource. The terminal device determines the first scheduling-free resource based on the second indication information, and then determines, by using the first indication information, the first HARQ process through which the data is transmitted by using the first scheduling-free resource.

In this embodiment, the first scheduling-free resource is indicated by using the second indication information in the DCI, and the first HARQ process on the first scheduling-free resource is further indicated by using the first indication information in the DCI, so that the terminal device can determine a HARQ process corresponding to the HARQ feedback information, and process data of the corresponding HARQ process, to improve data transmission efficiency. In addition, a HARQ process on which scheduling-free transmission is performed is indicated by using an existing field in the DCI, to reduce signaling overheads.

It should be understood that the terminal device may determine, by determining the PDCCH scrambled by using the first RNTI, a format of the DCI including the HARQ feedback information, to be specific, the DCI includes the first indication information and the second indication information. Alternatively, the terminal device may determine, by using the first resource location at which the PDCCH is located, a format of the DCI including the HARQ feedback information, to be specific, the DCI includes the first indication information and the second indication information. A principle is similar to that in the foregoing embodiment, and details are not described herein again.

Optionally, in another embodiment, the communication method further includes:

sending, by the terminal device to the network device, data of a third HARQ process and data of a fourth HARQ process on a second scheduling-free resource, where the third HARQ process and the fourth HARQ process correspond to different time domain locations on the second scheduling-free resource, the third HARQ process and the first HARQ process have a same process identity, and the fourth HARQ process and the second HARQ process have a same process identity. Correspondingly, the network device receives, from the terminal device, the data of the third HARQ process and the data of the fourth HARQ process that are carried on the second scheduling-free resource.

In this embodiment, one HARQ process may correspond to different scheduling-free resources at different times; and one scheduling-free resource may also correspond to different HARQ processes at different times.

The terminal device can determine, by using the second indication information that is in the DCI and that is used to indicate the first scheduling-free resource, a scheduling-free resource on which the HARQ process corresponding to the HARQ feedback information is located, and the terminal device specifically determines, by using the first indication information that is in the DCI and that is used to indicate the first HARQ process, the HARQ process corresponding to the HARQ feedback information.

In this embodiment, when the scheduling-free resource is in the one-to-many correspondence with the HARQ process, and a plurality of scheduling-free resources share HARQ PIDs of a plurality of HARQ processes, the first scheduling-free resource in the plurality of scheduling-free resources is indicated by using the second indication information in the DCI, and the HARQ process corresponding to the HARQ feedback information is indicated by using the first indication information in the DCI, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

Optionally, in some embodiments, a process identity of the first HARQ process, a process identity of the second HARQ process, and a process identity of a HARQ process for sending data on a scheduling resource are different from each other, and the process identity of the first HARQ process, the process identity of the second HARQ process, and the process identity of the HARQ process for sending the data on the scheduling resource each are one of M HARQ process identities, where M is an integer greater than 1.

For example, if the HARQ process identity field in the DCI includes two bits, the HARQ process identity field may indicate four HARQ processes. For example, 00 represents a HARQ process 1, 01 represents a HARQ process 2, 10 represents a HARQ process 3, and 11 represents the HARQ process 4.

Specifically, as shown in FIG. 5, the scheduling-free resource is in the one-to-many correspondence with the HARQ process. The first set of scheduling-free resources corresponds to the first HARQ process at a time domain location 1, the first set of scheduling-free resources corresponds to the second HARQ process at a time domain location 2, and the first set of scheduling-free resources corresponds to the third HARQ process at a time domain location 3. A second set of scheduling-free resources corresponds to the first HARQ process at a time domain location 4, the second set of scheduling-free resources corresponds to the second HARQ process at a time domain location 5, and the second set of scheduling-free resources corresponds to the third HARQ process at a time domain location 6. A third set of scheduling-free resources corresponds to the first HARQ process at a time domain location 7, the third set of scheduling-free resources corresponds to the second HARQ process at a time domain location 8, and the third set of scheduling-free resources corresponds to the third HARQ process at a time domain location 9. The time domain locations 1 to 9 do not overlap each other.

In the design shown in FIG. 5, transmission flexibility of performing scheduling-free transmission by using the HARQ process can be improved.

Optionally, in some embodiments, the communication method 200 further includes: configuring, by the network device, N sets of scheduling-free resources for the terminal device, where each set of the N sets of scheduling-free resources corresponds to a HARQ process, different scheduling-free resources correspond to different HARQ processes, and a first scheduling-free resource in the N sets of scheduling-free resources corresponds to the first HARQ process.

Optionally, in this embodiment, initial transmission time domain locations of each set of the N sets of scheduling-free resources are inconsecutive, initial transmission time domain locations of the different scheduling-free resources are different from each other, and initial transmission time domain locations of the N sets of scheduling-free resources as a whole are consecutive.

As shown in FIG. 3, there are three sets of scheduling-free resources. Each set of scheduling-free resources corresponds to one HARQ process, initial transmission time domain locations of each set of scheduling-free resources are inconsecutive, and initial transmission time domain locations of different sets of scheduling-free resources are different from each other.

In the design of this embodiment, initial transmission through the HARQ process can be initiated at any time. Compared with the prior art in which initial transmission through the HARQ process can be initiated only in a fixed time domain location, a transmission delay can be reduced in the solution of this embodiment.

Optionally, in this embodiment, initial transmission time domain locations of each set of the N sets of scheduling-free resources are consecutive.

As shown in FIG. 4, there are three sets of scheduling-free resources. Each set of scheduling-free resources corresponds to one HARQ process, and initial transmission time domain locations of each set of scheduling-free resources are consecutive.

In the design of this embodiment, initial transmission through the HARQ process can be initiated at any time. Compared with the prior art in which initial transmission through the HARQ process can be initiated only in a fixed time domain location, a transmission delay can be reduced in the solution of this embodiment.

Optionally, in some embodiments, after sending data by using a scheduling-free resource, the terminal device starts an uplink round trip time (UL RTT) timer; does not monitor a PDCCH during running of the UL RTT timer; starts a UL retransmission timer when the UL RTT timer expires; and monitors the PDCCH during running of the UL retransmission timer. Correspondingly, the network device receives the data sent by the terminal device by using the scheduling-free resource, starts the UL RTT timer, and does not send a scheduling resource to the terminal device before the UL RTT timer expires.

Specifically, the following steps are included.

(1) The network device configures a scheduling-free resource for the terminal device.

(2) After sending data through one HARQ process by using the scheduling-free resource, the terminal device starts a UL RTT timer; does not monitor a PDCCH during running of the UL RTT timer; starts a UL retransmission timer when the UL RTT timer expires; and monitors the PDCCH during running of the UL retransmission timer.

It should be understood that in a process of monitoring the PDCCH, the terminal device may obtain an uplink scheduling resource from the network device, so that the terminal device can implement reliable data transmission by using the uplink scheduling resource.

Optionally, in step (2), the terminal device sends the data through the HARQ process by using the scheduling-free resource. The data may be initial transmission data through the HARQ process, or may be one repetition of the data through the HARQ process, or may be retransmitted data (namely, data retransmitted according to a retransmission indication of the network device) through the HARQ process.

Specifically, the network configures a start time of the UL RTT timer. For example, the network device configures different start times for different logical channels.

In the prior art, it is stipulated that the UL RTT timer can be started only after last repetition on the HARQ process ends. Such a transmission mechanism cannot meet a requirement of a service with a high delay requirement.

A window (namely, a time) for starting the UL RTT timer is not limited in this embodiment, and the time for starting the UL RTT timer may be determined based on an actual requirement, so that different requirements of the service can be met to some extent. For example, if a power saving requirement is high, the UL RTT timer can be started after the last repetition. If a delay requirement is high, the UL RTT timer can be started once after initial transmission. If there is a compromise between a power saving requirement and a delay requirement, the UL RTT timer can be started after initial transmission and before the last repetition.

Optionally, in some embodiments, the following steps are included.

(1) The terminal device receives, from the network device, configuration information of a scheduling-free resource and a configuration parameter of a timer (time alignment timer).

(2) After receiving a timing advance command (TAC) sent by the network device, the terminal device starts or restarts the timer (time alignment timer) to perform timing adjustment.

It should be understood that the terminal device needs to receive the TAC before the timer (time alignment timer) expires. Therefore, if the terminal device receives no TAC before the timer (time alignment timer) expires, the terminal device considers that uplink is out of synchronization.

(3) If the terminal device receives no TAC before the timer (time alignment timer) expires, the terminal device considers that uplink is out of synchronization, and suspends the uplink transmission, but reserves the scheduling-free resource. If there is another dedicated resource, the terminal device also reserves the another dedicated resource.

Specifically, the resource that can be reserved includes at least one of the following resources: a PUCCH resource, an SRS resource, and a scheduling request (SR) resource.

It should be understood that when the uplink is in an out-of-synchronization state, the terminal device requires a random access process, requests uplink synchronization, and requests an uplink scheduling resource.

(4) When there is data to be sent, the terminal device requests an access process, and receives the TAC in the process of accessing a network. When receiving the TAC, the terminal device can directly perform the uplink transmission by using the scheduling-free resource or the dedicated resource reserved in step (3).

In the prior art, when no TAC is received before the timer (time alignment timer) expires, all uplink resources need to be released in addition to suspending the uplink transmission, and the uplink transmission can be performed only after an uplink resource is requested in a subsequent random access process. In addition, if RRC configuration is used, a configuration delay is long. Due to a poor signal condition, the terminal device may also fail to receive the TAC sent by the network device. In this case, the network device needs to perform RRC reconfiguration, thereby resulting in both a long delay and high signaling overheads.

In the prior art, the scheduling-free resource is released if no TAC is received before the timer (time alignment timer) expires. Therefore, data cannot be sent on the scheduling-free resource. After a secondary serving cell is implicitly or explicitly deactivated, the data cannot be sent on a scheduling-free resource configured in the secondary serving cell, either. Implicit deactivation means that after no data is transmitted for a period of time, the terminal device proactively deactivates the cell. To be specific, the terminal device does not send or receive data in the cell after deactivating the cell.

In this embodiment of this application, after the secondary serving cell is implicitly deactivated, the terminal device still reserves the scheduling-free resource, to quickly perform transmission on scheduling-free resource after the cell is activated. After the cell is activated, communication with the cell can be directly restored by using the scheduling-free resource.

In this embodiment of this application, the scheduling-free resource is reserved when the uplink is out of synchronization or the cell is deactivated, so that when the TAC is received or the cell is activated subsequently, the uplink transmission can be directly performed by using the reserved uplink resource without being restricted to using the uplink resource that is obtained as requested in the random access process. Therefore, compared with the prior art, a transmission delay can be reduced and transmission efficiency can be improved in the solution provided in this embodiment.

The solution of this embodiment is applicable to a URLLC service scenario.

The configuration information of the scheduling-free resource in this embodiment of this application includes at least one of the following parameters:

a resource identity of the scheduling-free resource, a quantity of HARQ processes for performing data transmission on the scheduling-free resource, a process identity of a HARQ process that can be used on the scheduling-free resource, a modulation and coding scheme (MCS) of the scheduling-free resource, a redundancy version used for initial transmission on the scheduling-free resource, a redundancy version used for retransmission on the scheduling-free resource, initial transmit power for performing transmission on the scheduling-free resource by using a HARQ process, a power ramping step for performing retransmission after transmission performed on the scheduling-free resource by using a HARQ process fails, a quantity of continuous repetitions for a data through a HARQ process by using the scheduling-free resource, a maximum quantity of retransmissions of a HARQ process for performing transmission based on the scheduling-free resource, a period of the scheduling-free resource, an initial transmission location on the scheduling-free resource, maximum transmit power for performing transmission on the scheduling-free resource, a PDCCH used to send HARQ feedback information of data received on the scheduling-free resource, and an RNTI used to scramble the PDCCH.

The power ramping step for performing retransmission on the scheduling-free resource after transmission on scheduling-free resource fails means that after the terminal device performs the transmission on scheduling-free resource, if the terminal device does not receive an acknowledgment feedback after waiting for a period of time, it is considered that the sending fails. The terminal device continues to perform retransmission on the scheduling-free resource. If maximum transmit power for performing transmission on the scheduling-free resource is not exceeded, the terminal device increases transmit power based on the power ramping step. The maximum quantity of retransmissions is a quantity of sending times that does not include a quantity of automatic repetition times. The terminal device discards data if the data fails to be sent after a maximum quantity of retransmissions of the data is reached.

It should be noted that the foregoing embodiments may be combined or mutually referenced based on internal logic of the technical solutions to form a new embodiment. Details are not described herein.

The foregoing describes the communication methods provided in the embodiments of this application. The following describes communications devices provided in embodiments of this application.

The foregoing mainly describes the solutions provided in the embodiments of this application from the perspective of interaction between network elements. It may be understood that, to implement the foregoing function, each network element, such as the terminal device or the network device, includes a corresponding hardware structure and/or software module for performing each function.

A person skilled in the art should be easily aware that units and algorithm steps in the examples described with reference to the embodiments disclosed in this specification can be implemented in a form of hardware or in a form of a combination of hardware and computer software in this application. Whether a function is implemented by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 6:
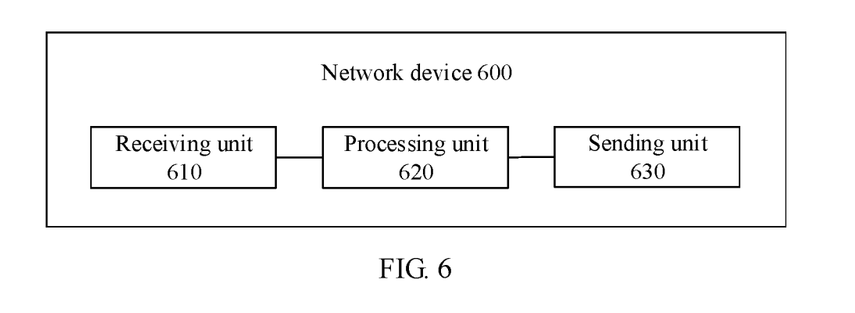
FIG. 6 is a schematic block diagram of a network device according to an embodiment of this application.

FIG. 6 is a schematic block diagram of a network device 600 according to an embodiment of this application. The network device 600 includes the following units:

a receiving unit 610, configured to receive, from a terminal device, data carried on a first scheduling-free resource, where the data is transmitted by using a first HARQ process;

a processing unit 620, configured to decode the data to generate HARQ feedback information; and a sending unit 630, configured to send downlink control information DCI to the terminal device, where the DCI includes the HARQ feedback information, the DCI further includes first indication information, and the first indication information is used to indicate the first HARQ process.

In this embodiment of this application, for uplink data sent by the terminal device by using a scheduling-free resource, a HARQ process corresponding to the HARQ feedback information is further indicated while the HARQ feedback information is sent to the terminal device by using the DCI, so that the terminal device can efficiently process data of the corresponding HARQ process based on the HARQ feedback information, to improve data transmission efficiency. In addition, a HARQ process on which scheduling-free transmission is performed is indicated by using an existing field in the DCI, to reduce signaling overheads.

Optionally, in an embodiment, the first scheduling-free resource is used to transmit only data of the first HARQ process, and the first indication information is specifically used to indicate the first scheduling-free resource.

Optionally, in an embodiment, the DCI is scrambled by using a first radio network temporary identifier RNTI, the first RNTI is used to indicate that the DCI includes feedback information of data sent by using a scheduling-free resource, and the first indication information is carried in a HARQ process identity field.

Optionally, in an embodiment, the DCI includes a first field, and the first field is used to indicate that the first indication information is carried in a HARQ process identity field.

Optionally, in an embodiment, the sending unit 630 is specifically configured to send a physical downlink control channel PDCCH at a first resource location, where the PDCCH carries the DCI, and the first indication information is carried in a HARQ process identity field.

Optionally, in an embodiment, the first scheduling-free resource is further used to transmit data of a second HARQ process, the first HARQ process and the second HARQ process correspond to different time domain locations on the first scheduling-free resource, the DCI further includes second indication information, and the second indication information is used to indicate the first scheduling-free resource.

Optionally, in an embodiment, the receiving unit 610 is further configured to receive, from the terminal device, data of a third HARQ process and data of a fourth HARQ process that are carried on a second scheduling-free resource, where the third HARQ process and the fourth HARQ process correspond to different time domain locations on the second scheduling-free resource, the third HARQ process and the first HARQ process have a same process identity, and the fourth HARQ process and the second HARQ process have a same process identity.

Optionally, in an embodiment, a process identity of the first HARQ process, a process identity of the second HARQ process, and a process identity of a HARQ process for sending data on a scheduling resource are different from each other, and the process identity of the first HARQ process, the process identity of the second HARQ process, and the process identity of the HARQ process for sending the data on the scheduling resource each are one of M HARQ process identities, where M is an integer greater than 1.

It should be understood that the processing unit 620 may be implemented by using a processor or a processor-related circuit component. The receiving unit 610 may be implemented by using a receiver or a receiver-related circuit component. The sending unit 630 may be implemented by using a transmitter or a transmitter-related circuit component.

Figure 7:
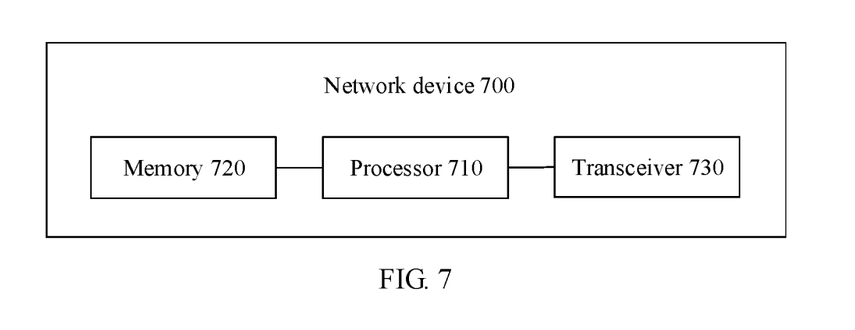
FIG. 7 is another schematic block diagram of a network device according to an embodiment of this application.

As shown in FIG. 7, an embodiment of this application further provides a network device 700. The network device 700 includes a processor 710, a memory 720, and a transceiver 730. The memory 720 is configured to store an instruction (or a computer program). The processor 710 is configured to execute the instruction stored in the memory 720, and the processor 710 is further configured to control the transceiver 730 to receive or send a signal. When the instruction stored in the memory 720 is executed, the transceiver 730 is configured to perform the operations performed by the receiving unit 610 and the sending unit 630 in the foregoing embodiment, and the processor 710 is configured to perform the operation performed by the processing unit 620 in the foregoing embodiment.

It should be understood that the network device 600 or the network device 700 provided in this embodiment of this application may correspond to the network device in the foregoing method embodiment. Each unit in the network device 600 or the network device 700 is also configured to perform a related operation in the foregoing method embodiment. For details, refer to the foregoing description. Details are not described herein again.

Figure 8:
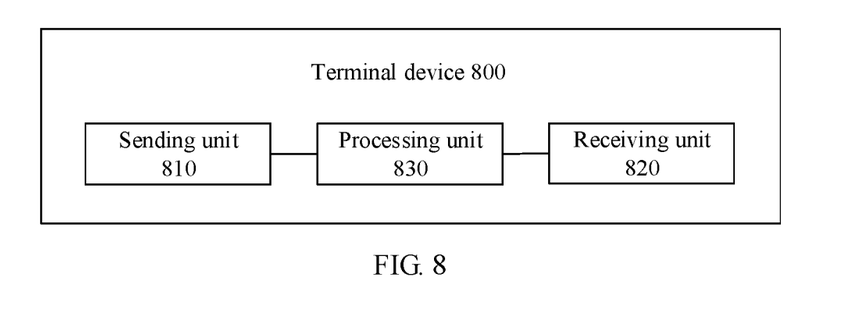
FIG. 8 is a schematic block diagram of a terminal device according to an embodiment of this application.

FIG. 8 is a schematic block diagram of a terminal device 800 according to an embodiment of this application. The terminal device 800 includes the following units:

a sending unit 810, configured to send data to a network device by using a first scheduling-free resource;

a receiving unit 820, configured to receive downlink control information DCI from the network device, where the DCI includes hybrid automatic repeat request HARQ feedback information generated by decoding the data, the DCI further includes first indication information, the first indication information is used to indicate a first HARQ process, and the first HARQ process is a HARQ process corresponding to the HARQ feedback information; and a processing unit 830, configured to process data of the first HARQ process based on the HARQ feedback information.

In this embodiment of this application, for uplink data sent by the terminal device by using a scheduling-free resource, the HARQ process corresponding to the HARQ feedback information is further indicated while the HARQ feedback information is sent to the terminal device by using the DCI, so that the terminal device can efficiently process the data of the corresponding HARQ process based on the HARQ feedback information, to improve data transmission efficiency. In addition, a HARQ process on which scheduling-free transmission is performed is indicated by using an existing field in the DCI, to reduce signaling overheads.

Optionally, in an embodiment, the first scheduling-free resource is used to transmit only the data of the first HARQ process, and the first indication information is specifically used to indicate the first scheduling-free resource.

The processing unit 830 is further configured to determine, based on a scheduling-free resource indicated by the first indication information, that the HARQ process corresponding to the HARQ feedback information is the first HARQ process.

Optionally, in an embodiment, the DCI is scrambled by using a first radio network temporary identifier RNTI, the first RNTI is used to indicate that the DCI includes feedback information of data sent by using the scheduling-free resource, and the first indication information is carried in a HARQ process identity field.

The processing unit 830 is further configured to determine, based on the first indication information, that the HARQ process corresponding to the HARQ feedback information is the first HARQ process.

Optionally, in an embodiment, the DCI includes a first field, and the first field is used to indicate that the first indication information is carried in a HARQ process identity field.

The processing unit 830 is further configured to determine, based on the first indication information, that the HARQ process corresponding to the HARQ feedback information is the first HARQ process.

Optionally, in an embodiment, the receiving unit 820 is specifically configured to receive, at a first resource location, a physical downlink control channel PDCCH from the network device, where the PDCCH carries the DCI, and the first indication information is carried in a HARQ process identity field.

The processing unit 830 is further configured to determine, based on the first indication information, that the HARQ process corresponding to the HARQ feedback information is the first HARQ process.

Optionally, in an embodiment, the first scheduling-free resource is further used to transmit data of a second HARQ process, the first HARQ process and the second HARQ process correspond to different time domain locations on the first scheduling-free resource, the DCI further includes second indication information, and the second indication information is used to indicate the first scheduling-free resource.

Optionally, in an embodiment, the sending unit 810 is further configured to send, to the network device, data of a third HARQ process and data of a fourth HARQ process on a second scheduling-free resource, where the third HARQ process and the fourth HARQ process correspond to different time domain locations on the second scheduling-free resource, the third HARQ process and the first HARQ process have a same process identity, and the fourth HARQ process and the second HARQ process have a same process identity.

Optionally, in an embodiment, a process identity of the first HARQ process, a process identity of the second HARQ process, and a process identity of a HARQ process for sending data on a scheduling resource are different from each other, and the process identity of the first HARQ process, the process identity of the second HARQ process, and the process identity of the HARQ process for sending the data on the scheduling resource each are one of M HARQ process identities, where M is an integer greater than 1.

It should be understood that the processing unit 830 may be implemented by using a processor or a processor-related circuit component. The receiving unit 820 may be implemented by using a receiver or a receiver-related circuit component. The sending unit 810 may be implemented by using a transmitter or a transmitter-related circuit component.

Figure 9:
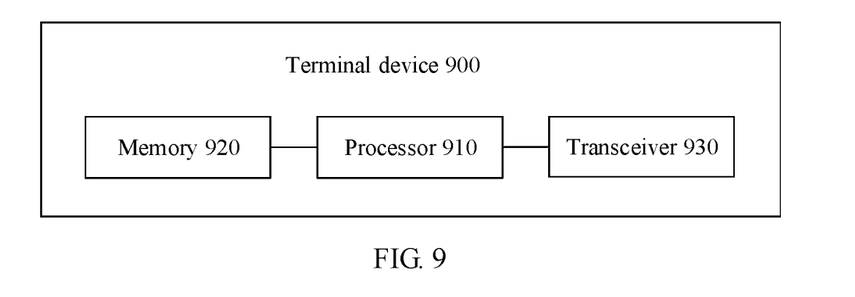
FIG. 9 is another schematic block diagram of a terminal device according to an embodiment of this application.

As shown in FIG. 9, an embodiment of this application further provides a terminal device 900. The terminal device 900 includes a processor 910, a memory 920, and a transceiver 930. The memory 920 is configured to store an instruction (or a computer program). The processor 910 is configured to execute the instruction stored in the memory 920, and the processor 910 is further configured to control the transceiver 930 to receive or send a signal. When the instruction stored in the memory 920 is executed, the transceiver 930 is configured to perform the operations performed by the sending unit 810 and the receiving unit 820 in the foregoing embodiment, and the processor 910 is configured to perform the operation performed by the processing unit 830 in the foregoing embodiment.

It should be understood that the terminal device 800 or the terminal device 900 provided in this embodiment of this application may correspond to the terminal device in the foregoing method embodiment. Each unit in the terminal device 800 or the terminal device 900 is also configured to perform a related operation in the foregoing method embodiment. For details, refer to the foregoing description. Details are not described herein again.

An embodiment of this application further provides a chip. The chip includes a processing unit and a communications interface. The processing unit is configured to perform the operation performed by the terminal device in the foregoing method embodiment, and the communications interface is configured to communicate with the external.

Optionally, the chip may further include a storage unit, and the storage unit stores an instruction. The processing unit is configured to execute the instruction stored in the storage unit. When executing the instruction, the processing unit is configured to perform the operation performed by the terminal device in the foregoing method embodiment.

An embodiment of this application further provides a chip. The chip includes a processing unit and a communications interface. The processing unit is configured to perform the operation performed by the network device in the foregoing method embodiment, and the communications interface is configured to communicate with the external.

Optionally, the chip may further include a storage unit, and the storage unit stores an instruction. The processing unit is configured to execute the instruction stored in the storage unit. When executing the instruction, the processing unit is configured to perform the operation performed by the network device in the foregoing method embodiment.

An embodiment of this application further provides a computer readable storage medium that stores a computer program. When the computer program is executed by a processor, the method on the terminal device side in the foregoing method embodiment can be implemented.

An embodiment of this application further provides a computer readable storage medium that stores a computer program. When the computer program is executed by a processor, the method on the network device side in the foregoing method embodiment can be implemented.

An embodiment of this application further provides a computer program product including an instruction. When the instruction is executed by a computer, the method on the terminal device side in the foregoing method embodiment can be implemented.

An embodiment of this application further provides a computer program product including an instruction. When the instruction is executed by a computer, the method on the network device side in the foregoing method embodiment can be implemented.

For explanations and beneficial effects of related content in any communications apparatus provided above, refer to a corresponding method embodiment provided above. Details are not described herein again.

It should be understood that the processor mentioned in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. According to a description that is used as an example instead of a limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memory (a storage module) is integrated into the processor when the processor is the general purpose processor, the DSP, the ASIC, the FPGA or another programmable logic device, the discrete gate or transistor logic device, or the discrete hardware component.

It should be noted that the memory described in this specification is intended to include but is not limited to these memories and any other proper type of memory.

It should be further understood that the terms "first", "second", and various numerical numbers in this specification are used for differentiation only for ease of description, but are not intended to limit the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:
   reserving, by a terminal device, after a secondary serving cell of the terminal device is deactivated, a scheduling-free resource,
      wherein the scheduling-free resource is a contention-based resource on which the terminal device can transmit data from a logical channel without needing to send a scheduling request after the secondary serving cell is activated, and
      wherein the scheduling-free resource belongs to the secondary serving cell;
   sending, by the terminal device, after the secondary serving cell is activated, the data to a network device on the scheduling-free resource,
      wherein the data is transmitted via a hybrid automatic repeat request (HARQ) process;
   receiving, by the terminal device, downlink control information (DCI) from the network device,
      wherein the DCI comprises HARQ feedback information, wherein the HARQ feedback information is generated in response to a decoding result of the data, and wherein the DCI further comprises indication information that indicates the HARQ process; and
   processing, by the terminal device, data of the HARQ process based on the HARQ feedback information.

2. The communication method according to claim 1, further comprising:
   starting, by the terminal device, an uplink round trip time (UL RTT) timer after initial transmission of the data; and
   stopping monitoring, by the terminal device during running of the UL RTT timer, of a physical downlink control channel (PDCCH).

3. The communication method according to claim 2, further comprising:
   starting, by the terminal device, a uplink (UL) retransmission timer in response to expiration of the UL RTT timer; and
   monitoring, by the terminal device, the PDCCH during running of the UL retransmission timer.

4. The communication method according to claim 1, wherein the scheduling-free resource is used to transmit only the data of the HARQ process, and the indication information indicates the scheduling-free resource; and
   wherein the method further comprises:
   determining, by the terminal device based on the scheduling-free resource indicated by the indication information, that the HARQ process is a HARQ process associated with the HARQ feedback information.

5. The communication method according to claim 1, wherein the DCI is scrambled by a radio network temporary identifier (RNTI), the RNTI indicates that the DCI comprises feedback information of data sent by using the scheduling-free resource, and the indication information is carried in a HARQ process identity field; and
   the communication method further comprises:
   determining, by the terminal device based on the indication information, that the HARQ process is a HARQ process associated with the HARQ feedback information.

6. An apparatus comprising a memory having processor-executable instructions stored thereon, and one or more processors coupled to the memory, wherein the processor-executable instructions, when executed, cause the one or more processors to:
   reserve, after a secondary serving cell is deactivated, a scheduling-free resource, wherein the scheduling-free resource is a contention-based resource on which the apparatus can transmit data from a logical channel without needing to send a scheduling request after the secondary serving cell is activated, and wherein the scheduling-free resource belongs to the secondary serving cell;
   send the data to a network device on the scheduling-free resource, wherein the data is transmitted via a hybrid automatic repeat request (HARQ) process;

receive downlink control information (DCI) from the network device, wherein the DCI comprises HARQ feedback information, wherein the HARQ feedback information is generated in response to a decoding result of the data, and wherein the DCI further comprises indication information that indicates the HARQ process; and process data of the HARQ process based on the HARQ feedback information.

7. The apparatus according to claim 6, wherein the one or more processors are further configured to:

start an uplink round trip time (UL RTT) timer after initial transmission of the data; and stop monitoring a physical downlink control channel (PDCCH) during running of the UL RTT timer.

8. The apparatus according to claim 7, wherein the one or more processors are further configured to:

start a uplink (UL) retransmission timer in response to expiration of the UL RTT timer expires; and monitor the PDCCH during running of the UL retransmission timer.

9. The apparatus according to claim 6, wherein the scheduling-free resource is used to transmit only the data of the HARQ process, and the indication information indicates the scheduling-free resource; and wherein the one or more processors are further configured to:

determine, based on the scheduling-free resource indicated by the indication information, that the HARQ process is a HARQ process associated with the HARQ feedback information.

10. The apparatus according to claim 6, wherein the DCI is scrambled by a radio network temporary identifier (RNTI), the first RNTI indicates that the DCI comprises feedback information of data sent by using the scheduling-free resource, and the indication information is carried in a HARQ process identity field; and wherein the one or more processors are further configured to:

determine, based on the indication information, that the HARQ process is a HARQ process associated with the HARQ feedback information.

11. A non-transitory computer-readable medium storing program for execution by an apparatus, wherein the program when executed, causes the apparatus to implement operations including:

reserving, after a secondary serving cell is deactivated, a scheduling-free resource, wherein the scheduling-free resource is a contention-based resource on which the apparatus can transmit data from a logical channel without needing to send a scheduling request after the secondary serving cell is activated, and wherein the scheduling-free resource belongs to the secondary serving cell;

sending the data to a network device on the scheduling-free resource, wherein the data is transmitted via a hybrid automatic repeat request (HARQ) process;

receiving, downlink control information (DCI) from the network device, wherein the DCI comprises HARQ feedback information, wherein the HARQ feedback information is generated in response to a decoding result of the data, and wherein the DCI further comprises indication information that indicates the first HARQ process; and processing data of the HARQ process based on the HARQ feedback information.

12. The non-transitory computer-readable medium according to claim 11, wherein the operations further comprise:

starting an uplink round trip time (UL RTT) timer after initial transmission of the data; and stopping monitoring of a physical downlink control channel (PDCCH) during running of the UL RTT timer.

13. The non-transitory computer-readable medium according to claim 12, wherein the operations further comprise:

starting a uplink (UL) retransmission timer in response to expiration of the UL RTT timer; and monitoring the PDCCH during running of the UL retransmission timer.

14. The non-transitory computer-readable medium according to claim 11, wherein the scheduling-free resource is used to transmit only the data of the HARQ process, and the indication information indicates the scheduling-free resource; and wherein the operations further comprise:

determining, based on the scheduling-free resource indicated by the indication information, that the HARQ process is a HARQ process associated with the HARQ feedback information.

* * * * *